(12) United States Patent
Bornschein

(10) Patent No.: US 8,547,652 B2
(45) Date of Patent: *Oct. 1, 2013

(54) MONOLITHIC OPTICAL MOUNT

(75) Inventor: Marco Bornschein, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/141,892

(22) PCT Filed: Dec. 9, 2009

(86) PCT No.: PCT/DE2009/050070
§ 371 (c)(1),
(2), (4) Date: Sep. 15, 2011

(87) PCT Pub. No.: WO2010/072217
PCT Pub. Date: Jul. 1, 2010

(65) Prior Publication Data
US 2011/0317288 A1 Dec. 29, 2011

(30) Foreign Application Priority Data
Dec. 23, 2008 (DE) .......................... 10 2008 063 223

(51) Int. Cl.
*G02B 7/02* (2006.01)
(52) U.S. Cl.
USPC ............................ 359/813; 359/811; 359/830
(58) Field of Classification Search
USPC .................................. 359/694–703, 811–824
See application file for complete search history.

(56) References Cited

U.S. PATENT DOCUMENTS

| | | | | |
|---|---|---|---|---|
| 3,262,360 A | * | 7/1966 | Gruner et al. .................. | 359/818 |
| 5,521,764 A | * | 5/1996 | Balogh et al. .................. | 359/824 |
| 6,229,657 B1 | * | 5/2001 | Holderer et al. ............... | 359/822 |
| 6,259,571 B1 | * | 7/2001 | Holderer et al. ............... | 359/819 |
| 7,242,537 B2 | * | 7/2007 | Weber et al. .................. | 359/811 |
| 2001/0028513 A1 | | 10/2001 | Takanashi et al. | |
| 2008/0019011 A1 | | 1/2008 | Krneta et al. | |

FOREIGN PATENT DOCUMENTS

| | | |
|---|---|---|
| DE | 198 27 603 A1 | 12/1999 |
| DE | 100 51 706 A1 | 5/2002 |
| DE | 100 62 786 A1 | 6/2002 |
| DE | 10 2007 030 579 A1 | 1/2008 |
| DE | 10 2006 060 088 A1 | 6/2008 |
| EP | 1 031 996 A2 | 8/2000 |
| EP | 1 020 751 B1 | 2/2004 |
| EP | 1 577 693 A2 | 9/2005 |
| WO | WO 2006/119970 A2 | 11/2006 |

* cited by examiner

Primary Examiner — Dawayne A Pinkney
(74) Attorney, Agent, or Firm — Duane Morris LLP

(57) ABSTRACT

The invention relates to a monolithic optical mount, which is divided by a plurality of cutouts into a stationary outer mount ring, a laterally adjustable inner mount ring, and manipulator units that are arranged with uniform offset from each other and formed by the remaining material connections. The cutouts have a uniform constant width and can therefore advantageously be produced by milling. The manipulator units have a simple geometrical design in the form of T- or L-shaped webs.

5 Claims, 4 Drawing Sheets

MONOLITHIC OPTICAL MOUNT

RELATED APPLICATIONS

The present application is a U.S. National Stage application of International PCT Application No. PCT/DE2009/050070 filed on Dec. 9, 2009 which claims priority benefit of German Application No. DE 10 2008 063 223.6 filed on Dec. 23, 2008, the contents of which are incorporated herein by reference in their entirety.

FIELD OF THE INVENTION

The invention relates to a monolithic optical mount, particularly a lens mount, which is divided by cutouts into a stationary outer mount ring and a lateral inner mount ring, adjustable in the vertical direction in reference to the optical axis of a mounted optical element. Such mounts allow for a radial adjustment of on optical element mounted in the inner mount ring in reference to the stationary outer mount ring, which is generally connected stationary to a housing and/or mounts of other optical elements. A generic mount is known from DE 10 2007 030 579 A1.

BACKGROUND OF THE INVENTION

An optical imaging device is known from EP 1 020 751 B1, in which the outer mount and the inner mount, adjustable in reference thereto, are preferably made in one piece, i.e., monolithically. A manipulator device, serving to displace an optic element mounted in a displacement-controlled fashion in the inner ring in a direction perpendicular in reference to the optical axis comprises a system of circumferential cutouts (recesses) between the inner ring and the outer mount, which form interposed connecting members, a rotary joint, and at least one adjusting joint with an adjusting member.

The disadvantage of this solution particularly comprises that it shows a complicated and asymmetrical design due to a plurality of differently shaped manipulator units, here called manipulator elements, which is unsuitable for symmetric systems or leads to system instabilities. In particular, the connecting members, acting as reinforcements in the direction of the optical axis but unnecessary cinematically, increase the production expenses, require additional actuators depending on their number, and cause deformations having a greater effect upon the inner part. Additionally, the adjusting joints require a separate flat spring and must be adjusted to ensure the intended adjustment in two opposite directions such that pre-stressing elements are necessary for both directions.

In DE 100 51 706 A1, a version is also disclosed which is divided by several cutouts into an inner mount and an outer mount, which remain connected between the cutouts, With these connections representing manipulator units in the sense of the invention. The cutouts are located such that via an activation of the connections by engaging manipulators, the inner mount and thus the lens held can be axially displaced and thus it represents no radially displaceable mount comparable to the one in the invention.

From DE 10 062 786 A1 a monolithically produced lens mount is known, decoupled from deformation, which here is divided by cutouts, called the annular gap, into an outer mount ring and an inner mount ring, The annular gap is interrupted several times by narrow connecting bars, here called solid joints. By extending the annular gap in the radial and tangential directions at the solid joints, they assume an L-shape, comprising a radially aligned outer bar section and a tangentially aligned inner bar section.

Sensors and actuators are arranged in form of films at the solid joints, each extending opposite over the length of the solid joints. Any oscillations and/or deformations detected by the sensors are forwarded via a computer to the actuators, which create counter oscillations and/or counter deformations.

Using a lens mount decoupled from deformations, no adjustment of any lens held in the inner mount ring is possible in reference to the outer mount ring, thus it cannot relate to a mount for a radial adjustment of a mounted lens.

DE 10 2006 060 088 A1 discloses a monolithic lens mount, here called mounting, in which radially elastic bars are embodied, with their foot ends contacting a mounted lens. This lens mount can compensate for differences in the expansion of the lens and the lens mounting due to fluctuating temperatures, however a mounted lens cannot be adjusted radially.

WO 2006/119970 A2 relates not to a monolithic optical mount, but to a mount comprising an assembly made from an inner mount ring and an outer mount ring, which are connected directly via connecting elements, comprising flat springs each connected to each other via bars, here called small bridges.

Another lens mount made in one piece and therefore being monolithic is known from EP 1 577 693 A2. In a preferred embodiment an inner ring is connected to an outer mount via three manipulator units, here called adjusting joints, having two hinged brackets each and an adjustment part located in between. Actuators engage the adjusting joints for a lateral adjustment of the inner ring and thus the optical element.

Compared to the abovementioned DE 100 51 706 A1, the solution disclosed here is characterized by a higher temperature stability.

As explained in EP 1 577 693 A2, during the heating of the optical element, e.g., a lens, the problem arises that the it is difficult for heat to dissipate via the few and narrow connection points between the inner ring and the outer mount. The temperature differences developing thereby have disadvantageous effects upon the imaging quality, because particularly a longitudinal change of the hinged brackets extending in the same direction leads to a displacement of the inner ring in said direction due to temperature changes, which results in aberrations and coma.

This problem is attained in a lens mount according to EP 1 577 693 A2 essentially such that the hinged brackets engage, off-set in reference to each other in the tangential direction by 120°, at the outer circumferential area of the inner ring and at the inner circumferential area of the outer mount in the clockwise direction away from the inner ring. A longitudinal change of the hinged brackets is here converted into a uniform direction of distortion. Distortions of this kind lead not to any aberrations, particularly not if lenses are the optical elements.

A lens mount according to EP 1 577 693 A2 is also said to be advantageous in that a higher lateral stiffness of the inner ring connection can be achieved by shortening the hinged brackets and thus the lens mount with the mounted lens is stiffer in reference to internal oscillations. A higher lateral stiffness by shortening the hinged brackets is achieved at the expense of the sensitivity of the adjustment, which not only concerns the length of the members but also the extend of the hinged brackets bending.

The length of the hinged brackets is here still predetermined by the tolerable material stress. This means when in a predetermined adjustment path and predetermined sensitivity the tolerable material stress limit is reached then no further shortening of the joints is possible to increase stiffness and/or resonance frequency. Consequently, always two relatively thin and, compared to the cross-section relatively long hinged brackets are necessary to implement the function as an adjustment unit and/or joint, which generally restricts the lateral and axial stillness achievable.

In DE 10 2007 030 579 A1, a first embodiment for a laterally adjustable lens mount is described, in which it is essentially equivalent to one according to EP 1 577 693 A2, i.e., three manipulator units arranged off-set by 120° in reference to each other are each embodied as members, which at their stationary ends transfer into two tangentially aligned hinged brackets, here called bars, which are connected to the inner mount part and/or the outer mount part.

In second embodiment the bars connecting the member to the inner and/or outer mount part are aligned radially, thus achieving higher lateral stiffness.

A deflecting of the lever, by introducing a radially acting force at the free end of the lever via a manipulator, leads to far higher tensile forces in the radial bars in reference to the tangential bars, though. The development of undesired tensions in the inner ring is unavoidable here.

In both embodiments, the manipulator units are simple lever gears, with their transmission being determined by the length of the member and the bending of the bars in the radial direction. In order to yield high sensitivity with an appropriate adjustment travel the bars and/or hinged brackets are embodied tong, which may lead to distortions in the axial direction.

In all abovementioned monolithic mounts the manipulator units are intentionally designed in their geometry and dimension such that they allow sensitive adjustments and a high adjustment stability, achieved as independent as possible from mechanical and thermal stress. The manipulator units, which represent the units by which an inner radially displaceable mount ring is connected to an outer stationary mount ring and by which a displacement of the inner mount ring is introduced in reference to the outer mount ring, are lever gears in the broadest sense according to prior art.

Lever gears have the purpose of transmitting or converting a path or a force. In the case of optical mounts, a distance shall be reduced generally in order to displace the mounted optical element as sensitively and therefore precisely as possible.

In order to produce a monolithic mount with manipulator units formed by lever gears, cutouts must be milled particularly embodied by material cutouts.

For this purpose, electro-erosive methods are generally used, such as wire eroding, by which very fine cutouts can be achieved. This way, on the one hand very small cutouts can be cut into the width of the separating cutouts and on the other hand cutouts of an arbitrary width, by aligning the cutouts along the circumference, wider than the cutting width.

The highly precise production of such mounts as well as the sensitive adjustability of an optical element in this mount is particularly opposed by high production costs due to the use of electro-erosive methods, which then seem unjustified if there are no higher requirements on the precision for the adjustment of such an optical element held in the mount.

OBJECTS OF THE INVENTION

The invention is therefore based on the object to provide a monolithic mount, in which the cutouts are predetermined with regards to their geometry and dimension such that they can be produced cost effectively by way of milling in order to keep the production costs tow. Here, a toss in sensitivity of adjustment can be accepted within predetermined limits.

This objective is attained in an optical mount having the features of claim 1, wherein the monolithic optical mount comprises an optical mount divided by a plurality of cutouts into a stationary outer mount ring; a laterally adjustable inner mount ring; and at least two manipulator units arranged equally off-set in reference to each other, wherein the manipulator units are formed by a plurality of bars formed by the cutouts, and wherein the mount comprises at least two actuators for manipulating the manipulator units, characterized in that the cutouts show an equally constant width and separate the inner mount ring from the outer mount ring except in that the bars forming the manipulator units and the bars comprising a radially aligned inner bar section and a tangentially aligned outer bar section and the actuators are arranged engaging the inner bar sections, acting in the radial direction.

Advantageous embodiments and further developments are the objective of the sub-claims.

BRIEF DESCRIPTION OF THE DRAWINGS

In the following, the invention is explained in greater detail using the drawings.

It shows.

DESCRIPTION OF THE EMBODIMENTS

The embodiments shown in FIGS. 1 through 4 of a monolithic optical mount according to the invention are optical mounts with lens mounts. Similar to mounts known in prior art from DE 10 2007 030 579 A1 are made from a rotary-symmetrical planar body, particularly comprising steel, aluminum, or brass and are divided by several cutouts 3 into a stationary outer mount ring 1 and a laterally adjustable inner mount ring 2.

In general, using an optical mount according to the invention other optical elements, such as mirrors or beam splitters, may also be mounted. In general, they are not subject to such precise adjustment requirements, thus the mount is particularly useful for lens mounts.

Also similar to the lens mount according to DE 10 2007 030 579 A1, in a mount according to the invention uniform manipulator units are formed by the cutouts 3, equally off-set in reference to each other, by which at a certain introduction of a radially acting force $F_R$ a displacement of the inner mount ring 2 is caused in reference to the outer mount ring 1.

The difference to prior art results from the geometry of the locations and the dimension of the cutouts 3. All embodiments share that the cutouts 3 are of equally constant width, thus using a miller with a diameter equal to the width of the cutouts 3 all cutouts 3 can be formed completely using only a single cutting process along the center line of the cutouts 3.

It is possible to embody the cutouts 3 partially wider; however, this would lead to no additional effectiveness of the mount, and increase the production expense for the cutouts 3.

In contrast to the prior art, in which the cutouts 3 are only partially created directly by separating cuts, essentially however cutting occurs along the circumference of the cutouts 3 and the cutouts 3 are milled, in a mount according to the invention all cutouts 3 are produced by separating cuts in the broadest sense, when separating by milling is considered cutting.

This means that the travel of the relative motion between the optical mount as a work piece and the miller as the tool is identical to the total of the lengths of all cutouts 3 and thus is as short as possible.

Furthermore, seen in the radial direction, the cutouts 3 hardly extend beyond each other, so that the travel of the relative motion is only slightly longer than a circular line inside the body.

Figure 1:
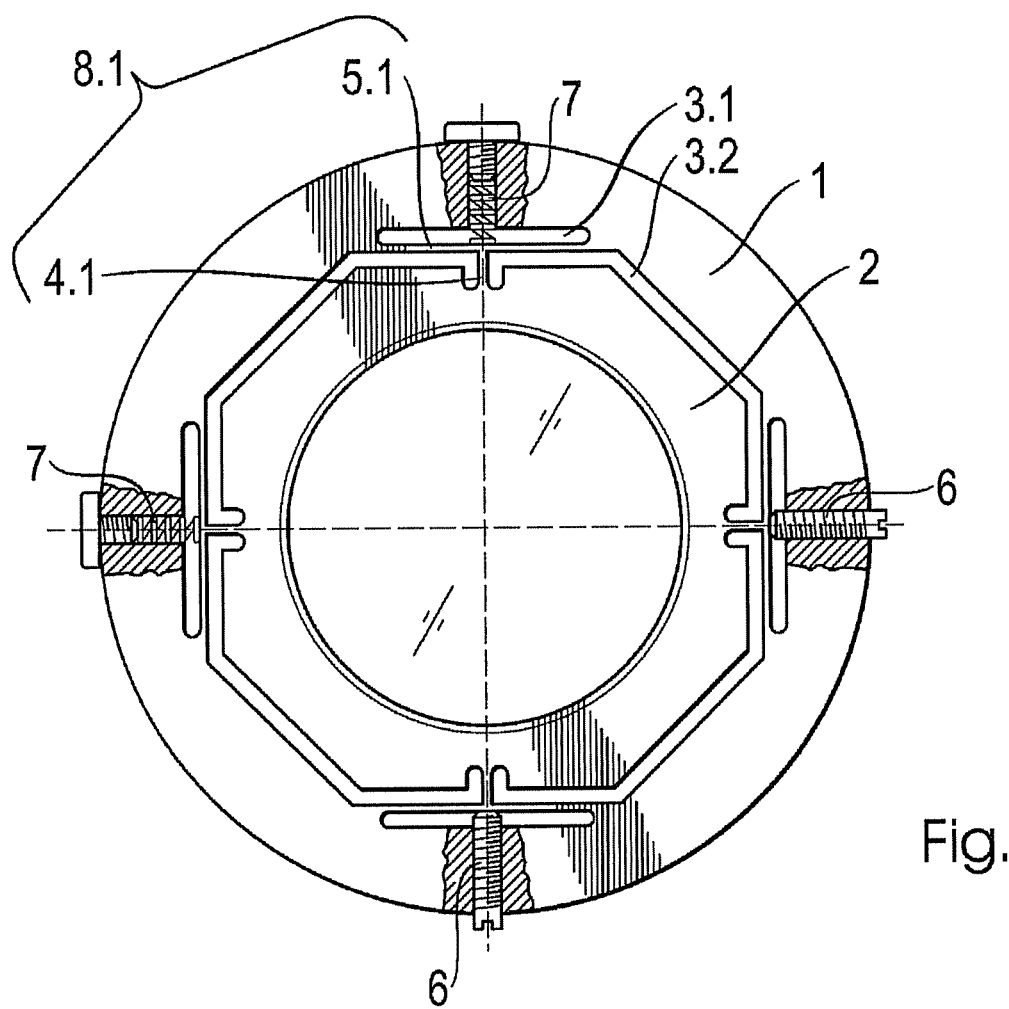
FIG. 1 Top view of a first embodiment of a mount according to the invention
Figure 2:
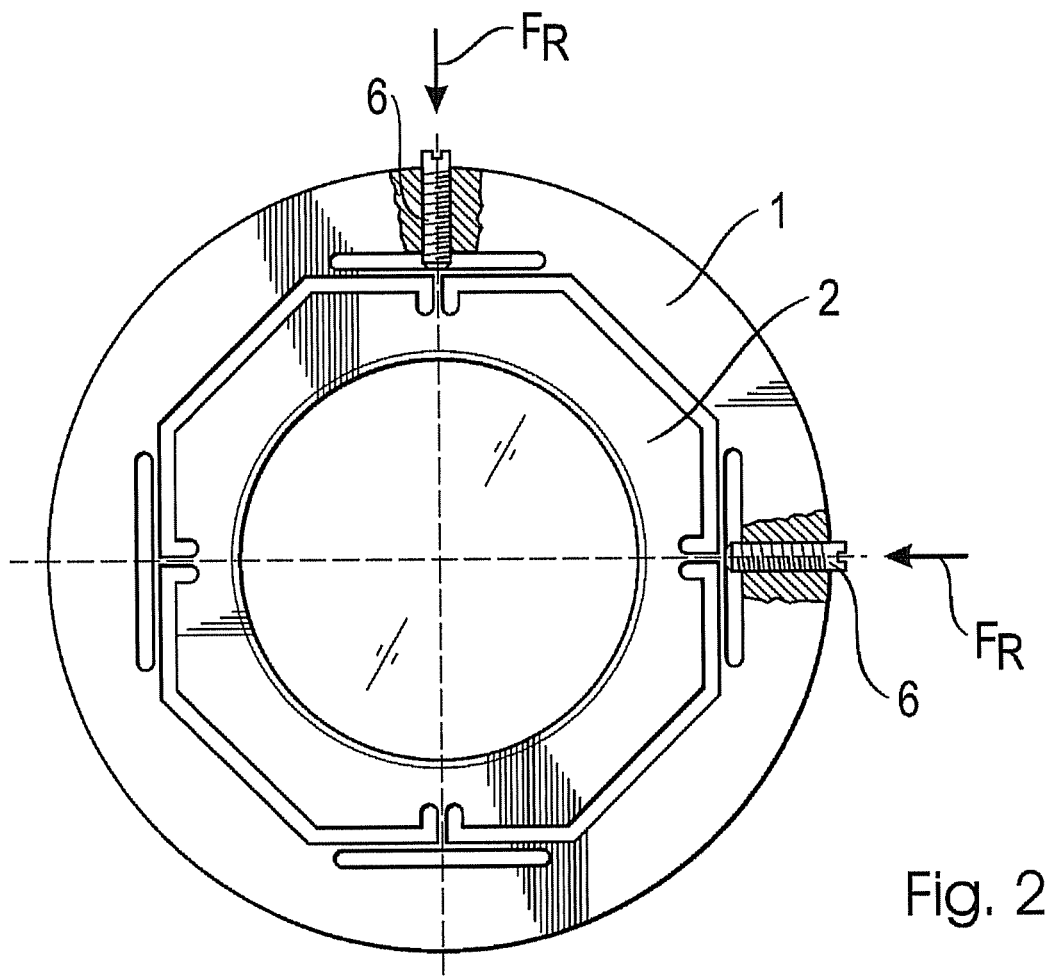
FIG. 2 Top view of a second embodiment of a mount according to the invention

In the embodiment according to FIGS. 1 and 2 there are two groups of four cutouts 3.1, 3.2, each, which jointly form T-shaped bars 8.1, representing the manipulator units.

The T-shaped bars 8.1 comprise a head part 5.1 which forms a tangentially aligned outer bar section and a foot part 4.1 which forms a radially aligned inner bar section.

The first group of cutouts 3.1 are straight slots, each forming the upper edge of the head part 5.1 of a T-shaped bar 8.1 The second group of the cutouts 3.2 are repeated, inwardly angled slots, which essentially extend sectionally, tangential to a virtual circular line and each limit of the tower edge of the head part 5.1 as well as the foot part 4.1 of T-shaped bar 8.1. The foot part 4.1, which forms an inner bar section, is connected to the inner mount ring 2 and the head part 5.1, which represents the outer bar section, is connected at the end side with the outer mount ring 1.

Advantageously, all cutouts 3.1 of one group will be produced first, before the cutouts 3.2 of the other group are created. This way, two tool and work piece cycles are required, however the motion can occur without reversing the sense of direction.

Figure 3:
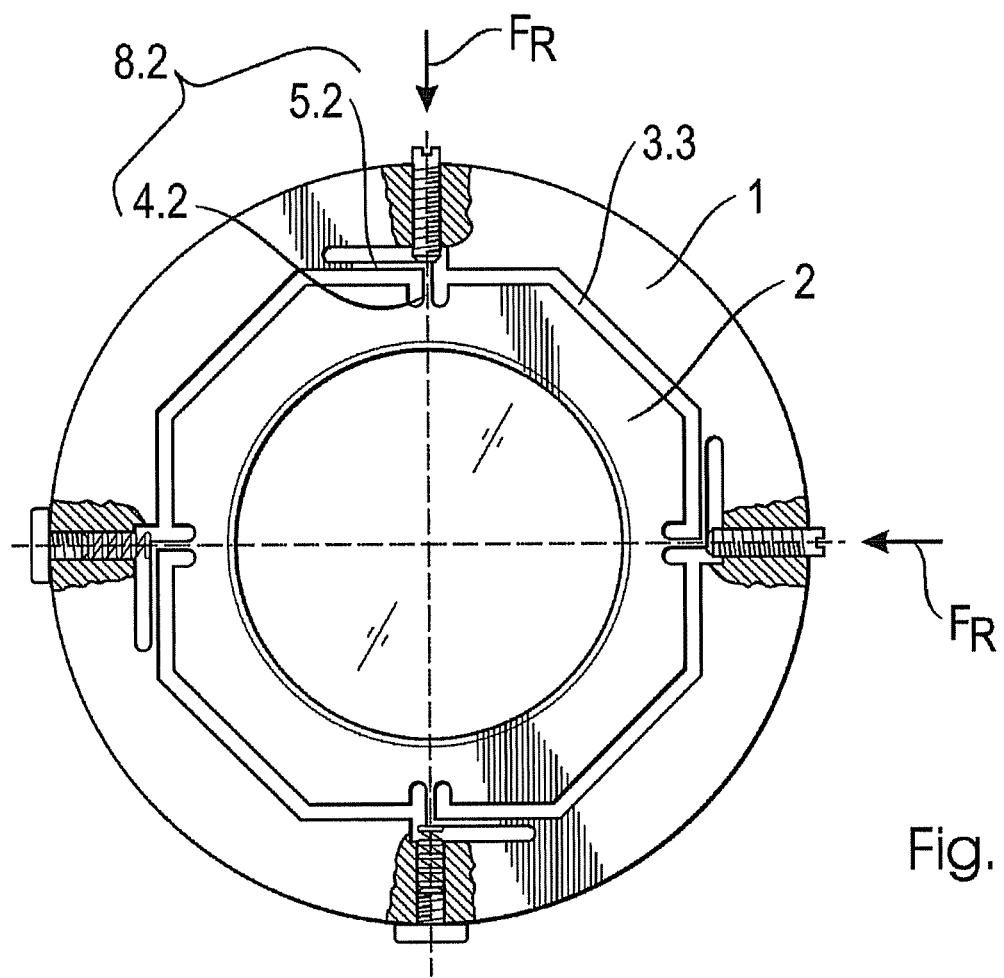
FIG. 3 Top view of a third embodiment of a mount according to the invention
Figure 4:
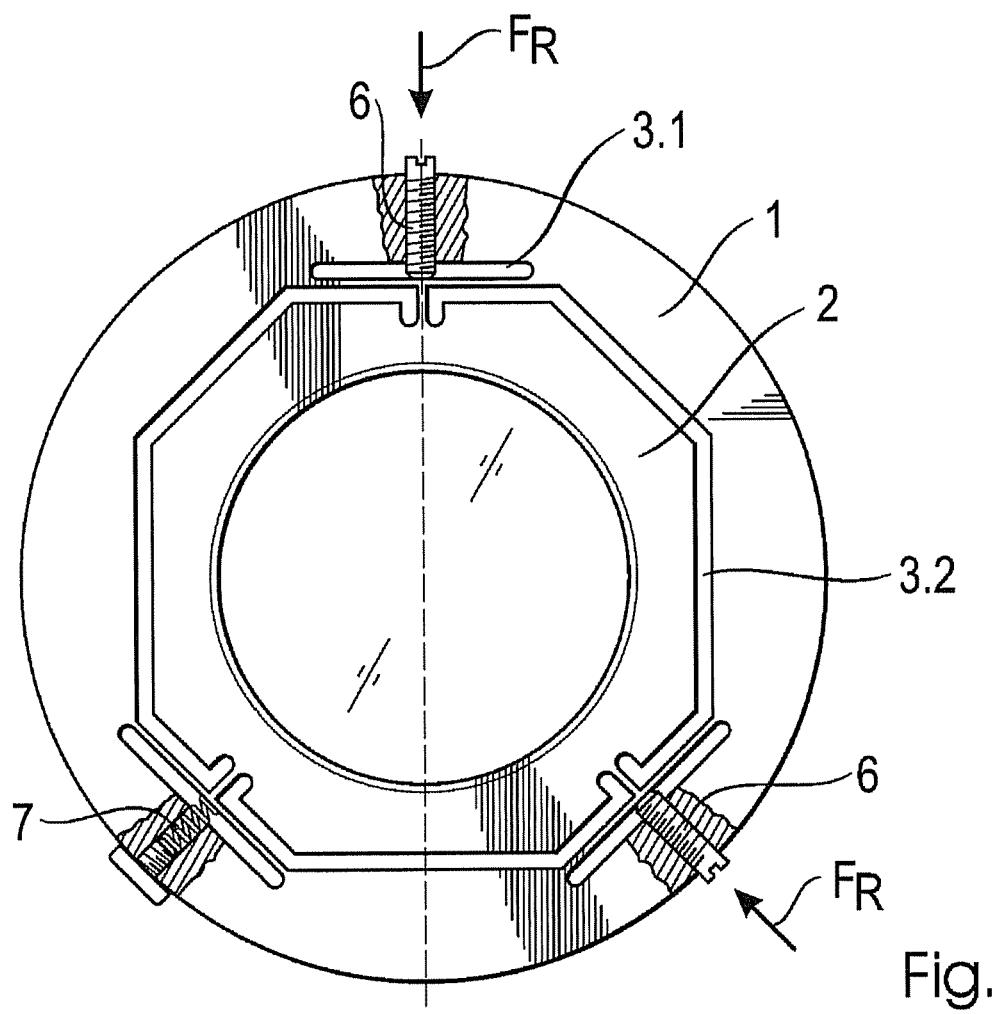
FIG. 4 Top view of a fourth embodiment of a mount according to the invention

In the embodiment according to FIG. 3, there is only one group of four cutouts 3.3.

Compared to the cutouts 3.2, which represent slots angled inwardly several times, they represent slots amended by a partial section angled outward.

In this context, these cutouts 3.3 form L-shaped bars 8.2, which represent the manipulator unit.

A first leg 4.2 of the L-shaped bars 8.2 forms one inner, radially aligned bar section each, which is connected to the inner mount ring 2 and the second leg 5.2 represents an outer, tangentially aligned bar section, which at its end is connected to the outer mount ring 1.

Advantageously, either three (FIG. 4) or four manipulator units (FIGS. 1-3) are provided. Actuators 6 engage at two of the manipulator units each at the radially aligned inner bar sections, i.e., al the foot part 4.1 and/or the first leg 4.2, acting in the radial direction. The actuators 6 can represent threaded bolts, in the simplest case, in order to allow displacement of the mounted lens and thus its optical axis radially in reference to the mechanical axis of the mount.

In order for the displacement occurring not only in the positive direction of force of the actuators 6, i.e., towards the mechanical axis, but also in the negative direction of force, either pressure springs 7 engage the other manipulator units or the manipulator units are pre-stressed over the entire range of motion so that a return force is provided via the pre-stressing in each relative position of the inner mount ring 2 and the outer mount ring 1.

By the actuators 6 being directly connected with the radially aligned inner bar sections, acting in the radially direction, the force originating from the actuators 6 and/or from the displacement path realized by them is directly transferred to the inner mount ring 2. The adjustment is therefore comparatively less sensitive, however for many applications it is sufficiently precise.

The potential displacement travel is determined by the stiffness of the material of the mount and the length of the outer tangentially aligned bar sections, namely the head parts 5.1 and/or the first leg 4.2, acting like flat springs.

A lens mount according to the invention can advantageously be produced by milling. Depending on the desired width of the cutouts 3 a miller is selected having an appropriate diameter, thus the width of the cutouts 3 is determined by the width of the developing cut.

Of course, the cutouts 3 can also be enlarged in their widths partially or entirely by executing several cuts partially overlapping or also directly next to each other.

A widening of the cutouts 3 particularly in the area of the manipulator units and particularly a lengthening of the bars allows to increase the range of displacement.

In order to widen the cutouts 3, a miller will be used having a larger diameter. Widening only the material cuts contributing to the formation of the inner and the outer mount rings 2, 1, but not to the formation of the manipulator units, has no consequences on the effectiveness of the mount.

Widening only the cutouts 3 in the area of the manipulator units by performing a milling laterally overlapping over its width increases the processing time and represents a less beneficial embodiment of a mount according to the invention.

The stiffness of the manipulator units is determined by the width and the thickness of the bars, regardless of material stiffness.

The optical mount according to the invention is characterized by a very simple and thus cost-effective production, while fulfilling its function with sufficient precision for at least some applications.

LIST OF REFERENCE CHARACTERS

1 Stationary outer mount ring
2 Adjustable inner mount ring
3 Cutout
4.1 Foot part of a T-shaped bar
4.2 First leg of a L-shaped bar
5.1 Head part of a T-shaped bar
5.2 Second leg of a L-shaped bar
6 Actuator
7 Spring
8.1 T-shaped bar
8.2 L-shaped bar
$F_R$ Radial force While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A monolithic optical mount, comprising an optical mount divided by a plurality of cutouts into a stationary outer mount ring; an adjustable inner mount ring; and at least two manipulator units arranged equally off-set with reference to each other, said inner mount ring being arranged so as to be laterally adjustable, said manipulator units being formed by a plurality of bars formed by said cutouts, and at least two actuators for manipulating the manipulator units, said cutouts having an equally constant width and serve to separate the inner mount ring from the outer mount ring except in that the bars forming the manipulator units and the bars forming a radially aligned inner bar section and a tangentially aligned outer bar section, and said actuators being arranged engaging the inner bar sections, acting in the radial direction.

2. A monolithic optical mount according to claim 1, wherein said bars are T-shaped bars having a foot part and a head part, said foot part forming the inner bar section, which is connected to the laterally adjustable inner mount ring, said head part representing the outer bar section, which is connected at the end side to the outer mount ring.

3. A monolithic optical mount according to claim 1, wherein said bars are L-shaped bars, with a first leg forming the inner bar section, which is connected to the laterally adjustable inner mount ring, and the second leg representing the outer bar section, which is connected at the end side to the outer mount ring.

4. A monolithic optic mount according to claim 1, further comprising three manipulator units off-set in reference to each other by 120°.

5. A monolithic optic mount according to claim 1, further comprising four manipulator units off-set in reference to each other by 90°.

* * * * *